(12) United States Patent
Goel et al.

(10) Patent No.: US 7,640,550 B1
(45) Date of Patent: Dec. 29, 2009

(54) CONTEXT SENSITIVE CONTACT BROKER

(75) Inventors: Amit Goel, St. Petersburg, FL (US); Michael J. Krack, St. Petersburg, FL (US); Ronald S. Rozensky, Bradenton, FL (US); E. Lee Shero, McKinney, TX (US); Roy V. Witcher, New Port Richey, FL (US)

(73) Assignee: Avaya Inc., Basking Ridge, NJ (US)

( * ) Notice: Subject to any disclaimer, the term of this patent is extended or adjusted under 35 U.S.C. 154(b) by 879 days.

(21) Appl. No.: 11/193,728

(22) Filed: Jul. 28, 2005

(51) Int. Cl.
- *G06F 3/00* (2006.01)
- *G06F 9/46* (2006.01)
- *G06F 13/00* (2006.01)
- *G06F 3/048* (2006.01)
- *G06F 15/16* (2006.01)
- *G06F 17/30* (2006.01)

(52) U.S. Cl. .................. 719/313; 719/320; 715/810; 709/206; 707/3

(58) Field of Classification Search ......... 719/312–317, 719/320; 715/751, 810; 709/201–202, 204–207, 709/217; 707/3
See application file for complete search history.

(56) References Cited

U.S. PATENT DOCUMENTS

| 6,005,928 | A | 12/1999 | Johnson |
| 6,650,751 | B1 | 11/2003 | Becker |
| 6,678,374 | B1 | 1/2004 | Becker |
| 6,697,456 | B2 | 2/2004 | Chan et al. |
| 7,133,895 | B1 * | 11/2006 | Lee et al. ............ 709/204 |
| 2006/0053379 | A1 * | 3/2006 | Henderson et al. ...... 715/751 |
| 2006/0242109 | A1 * | 10/2006 | Pereira et al. ............ 707/1 |

FOREIGN PATENT DOCUMENTS

WO   WO 01/67241 A1   9/2001

OTHER PUBLICATIONS

Avaya—Press Release—"IBM and Avaya Team to Integrate Audio With Collaboration Tools," http://www.avaya.com\gcm\master\usa\en\us\corporate\pressroom\pressreleases\2005... (Copyright 2005) (2 pages).
Clusty—"Clusty Toolbar for Firefox," Version 1.0.2 (Printed Jun. 10, 2005) (4 pages).
Savill, John "What's New in Microsoft Windows Messenger 5.1?" http://www.windowsitpro.com/Articles/Print.cfm?ArticleID=44804 (Dec. 14, 2004) (3 pages).
Clusty—"Clusty Toolbar for Firefox," "Download the Toolbar Now!" http://clusty.com/toolbar/firefox (Printed Jul. 23, 2005) (2 pages).
Clusty—"Clusty the Clustering Engine," "Download the Toolbar Now!" http://clusty.com/toolbar (Printed Jul. 23, 2005) (1 page).

* cited by examiner

*Primary Examiner*—Hyung S Sough
*Assistant Examiner*—Qing-Yuan Wu
(74) *Attorney, Agent, or Firm*—Sheridan Ross P.C.

(57) ABSTRACT

A system for initiating a contact, comprising a broker 236 operable (a) to receive a first type of information selected by a user, the first type of information being accessed through a first application; (b) locate a second type of information associated with the first type of information, the second type of information being stored by a second application different from the first application; and (c) initiate a communication to a communication device identified by the second type of information.

26 Claims, 4 Drawing Sheets

CONTEXT SENSITIVE CONTACT BROKER

FIELD

The invention relates generally to inter-party communications and particularly to automated initiation of inter-party communications.

BACKGROUND

The combination of the Internet and high speed computers has provided computer users with a vast array of communications options from a single network communications device. Examples of communication options include Electronic mail or E-mail, text chat, instant messaging, voicemail and Voice over IP or VoIP. In particular, VoIP, which is a packet-switched voice communication, may be performed by an IP softphone application running on a Personal Computer (PC) or as a hardware device, such as an IP phone (donisys™ i750 or Avaya 4624™). An example of such an IP softphone is the Avaya IP Softphone™ manufactured by Avaya Inc. The software emulates a telephone and communicates signaling and voice information via an IP-network connection between the host computer and a telecommunication switching system (also referred to as a Private Branch Exchange or PBX) or directly to another device (also referred to as peer-to-peer). This network connection is often the Internet or a Local Area Network or LAN. Audio information being received from the network is communicated with the user via a headset or handset by means of a sound card that interfaces the headset or handset to the PC. When a user speaks, the sound card converts the analog information to digital information that the software then transmits to a destination via the network. When a call is received via the network for the IP softphone, the software alerts the user via an internal or external speaker attached to the PC.

Automatic initiation of a selected type of contact from a single communications device is desirable for user convenience. Various products provide limited functionality in this area. Avaya's IP Softphone™ highlights telephone numbers in web content (i.e., a HyperText Mark up Language or HTML page) accessed by Microsoft's Internet Explorer™. The numbers are located by the Softphone application before the web content is displayed to the user. The user can click on a highlighted number and the Softphone application will automatically initiate a VoIP contact to the number. Microsoft Outlook™, an email application, can perform searches for information associated with a person's name. When an email is received, the user can right click on the "FROM" field, and, in response, the Outlook application will look up the email address in the local address book. If it locates a telephone number for the email sender, Outlook provides the user with the option of automatically initiating a VoIP contact to the sender.

Existing applications for automatic initiation of contacts generally are limited to specific types of contacts and specific record search locations, require a code modification within the application, and/or are initiated by receipt of a communication from the other communicant.

SUMMARY

These and other needs are addressed by the various embodiments and configurations of the present invention. The present invention is directed generally by performing a first set of operations to automatically initiate a second set of operations.

In a first embodiment, the present invention provides a method for initiating a contact, comprising:

(a) receiving a first type of information (e.g., name of a contactee) selected by a user, the first type of information being accessed through a first application;

(b) locating a second type of information (e.g., an electronic address) associated with the first type of information, the second type of information being stored by a second application different from the first application; and (c) initiating a communication to a communication device identified by the second type of information (e.g., creating a blank email message with some fields populated, requesting a VoIP application to place a call, etc.). An "application" or "application program" is a collection of software and/or hardware modules for performing specific types of user-oriented work on a computer that are frequently not related to the computer itself. Examples of applications include word processors, spreadsheets, programs for maintaining an electronic address book and telephone directory, contact directory programs, accounting programs, software development programs, and engineering programs.

In one configuration, a broker receives a request from an application for contact information for an individual or meeting (e.g., conference bridge). The broker requests the contact information from all registered applications that maintain contact data. The broker then aggregates the data and passes it to the communications application to initiate a call or other contact.

The embodiment can be "thin" in that it puts the burden of determining how a communication will be made (e.g., finding an electronic address) on the broker and initiates the communication through the broker. Any application, such as Microsoft Word™, a web browser, Microsoft Outlook™, Lotus Notes™, Webex™, and Notepad™, remains isolated from the address books and unaware of the application that will ultimately initiate the contact. The application simply sends the highlighted first type of information to the broker which then takes over the request. The broker can be part of the operating system and, in that configuration, is triggered by the operating system, such as through a hotkey or a right-click menu item. The operating system can broker a name from one use in a first application and collect information from other objects relating to that name. The broker can be external to the operating system and, in that configuration, is preferably triggered by monitoring the operating system's clipboard for short strings that could represent the first type of information. When a clipboard entry matches exactly an address book entry, a communication confirmation screen is presented. In the integrated configuration, no confirmation screen is required unless multiple matches are found. In either configuration, no code is commonly required within the productivity application to initiate a communication while working in the application.

The embodiment can provide seamless interaction between applications and external communication devices. From the user's perspective, initiating the communication is a one-step process performed within the current application; existing products require multiple steps and interfacing with multiple applications. The user is no longer required to look up contact information manually, and then enters this information in another application or device to initiate communication, which is time and labor intensive. The invention can interface with any application executing on the operating system to initiate a communication via a hotkey that is interpreted by the operating system, a right-click menu item that is generated by the operating system, or a copy-to-clipboard action. Existing brokers cannot handle an operating system request for contact information on an individual or conference call and translate that request into a call activation. The embodiment can increase user efficiency and convenience in all aspects of voice communications, including conference calling, speed dialing, and retrieving contact information.

In a second embodiment, the present invention provides a computational method including the steps:

(a) a first application performing a first set of operations for a user;

(b) a broker external to the first application monitoring the first application for the first set of operations and/or a clipboard for first information from the first set of operations; and (c) when the broker detects first set of operations and/or the first information on the clipboard, the broker initiating a second application different from the first application. As will be appreciated, the broker is preferably implemented in computer executable instructions stored on a computer readable medium.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means lone, B alone, C alone, A and B together, A and C together, B and C together, or A, B and C together.

DETAILED DESCRIPTION

Figure 1:
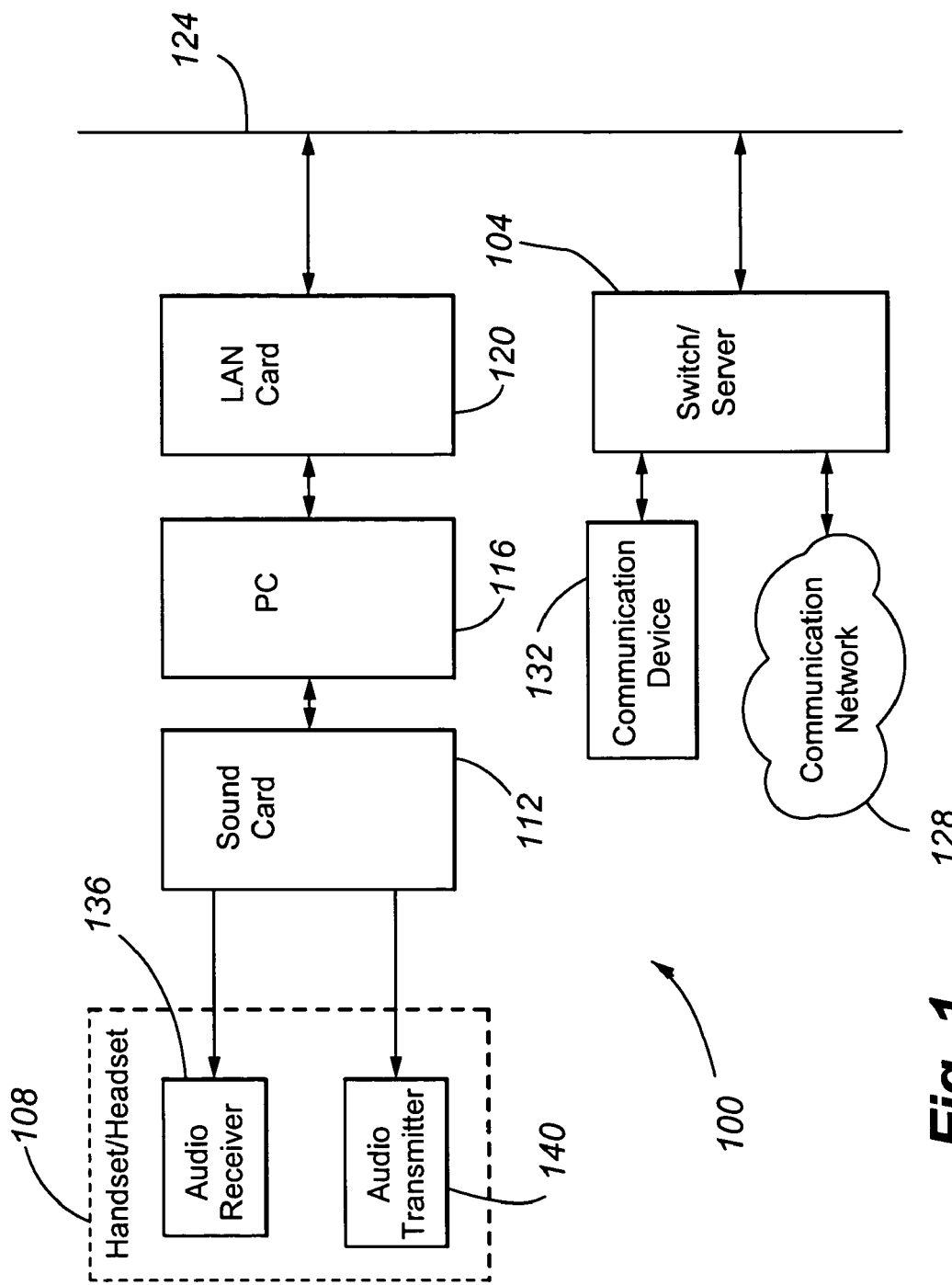
FIG. 1 is a block diagram of a conventional VoIP architecture that may be modified to accommodate an embodiment of the present invention.

FIG. 1 illustrates a communications system 100 that may be modified in accordance with a first embodiment of the invention. With reference to FIG. 1, a switch and/or server 104 is supplying telephone service for a user that is utilizing handset/headset 108 via sound card 112, Personal Computer (PC) 116, Local Area Network or LAN card 120, and LAN 124. A "personal computer" refers to a computer designed to be used by only one person at any one time, whether at home or in a business setting. A personal computer includes desk top and laptop computers. As will be appreciated, the computer 116 may be connected to the LAN 124 wirelessly. Switch and/or server 104 supplies access to the general public by being interconnected to a circuit-switched and/or packet-switched communications network 128, such as the Public Switched Telephone Network and/or Internet. One skilled in the art will readily see that the LAN card 120 and sound card 112 could be internal to the PC 116. Switch and/or server 104 can be any switch and/or server, such as an Avaya Definity Business Communication Switching System™.

While a switch and/or server 104 is illustrated in FIG. 1, one skilled in the art will readily envision that switch and/or server 104 could be any of a variety of switching equipment. For example, switch and/or server 104 could be a Public Switching Telephone Network (PSTN) gateway box in an H.323 calling system. As will be appreciated, the switch and/or server 104 is not required by certain implementations of the present invention. An example of such an implementation is SKYPE™ peer-to-peer Internet telephony system.

Switch and/or server 104 supplies service for other users utilizing a conventional communication device 132, such as a telephone. Additionally, other handsets/headsets similar to handset/headset 108 can be interconnected to LAN 124 by having individual sound cards, PC's, and LAN cards. PC 116 receives control signaling and voice information from the switch and/or server 104, and PC 116 in turn transmits voice information and control signaling information to switch and/or server 104 via LAN card 120 and LAN 124.

Sound card 112 performs the function of converting audio information received from PC 116 to analog signals and transmitting those to audio receiver 136 (that may be a simple speaker arranged in handset/headset 108). Sound card 112 similarly converts audio information from audio transmitter 140 (that may be a simple microphone) to digital information, which is transmitted to PC 116.

Other software applications in PC 116 emulate a telephone with respect to switch and/or server 104 with the exception that switch and/or server 104 is transmitting and receiving information via LAN 124 rather than a telephone link.

Figure 2:
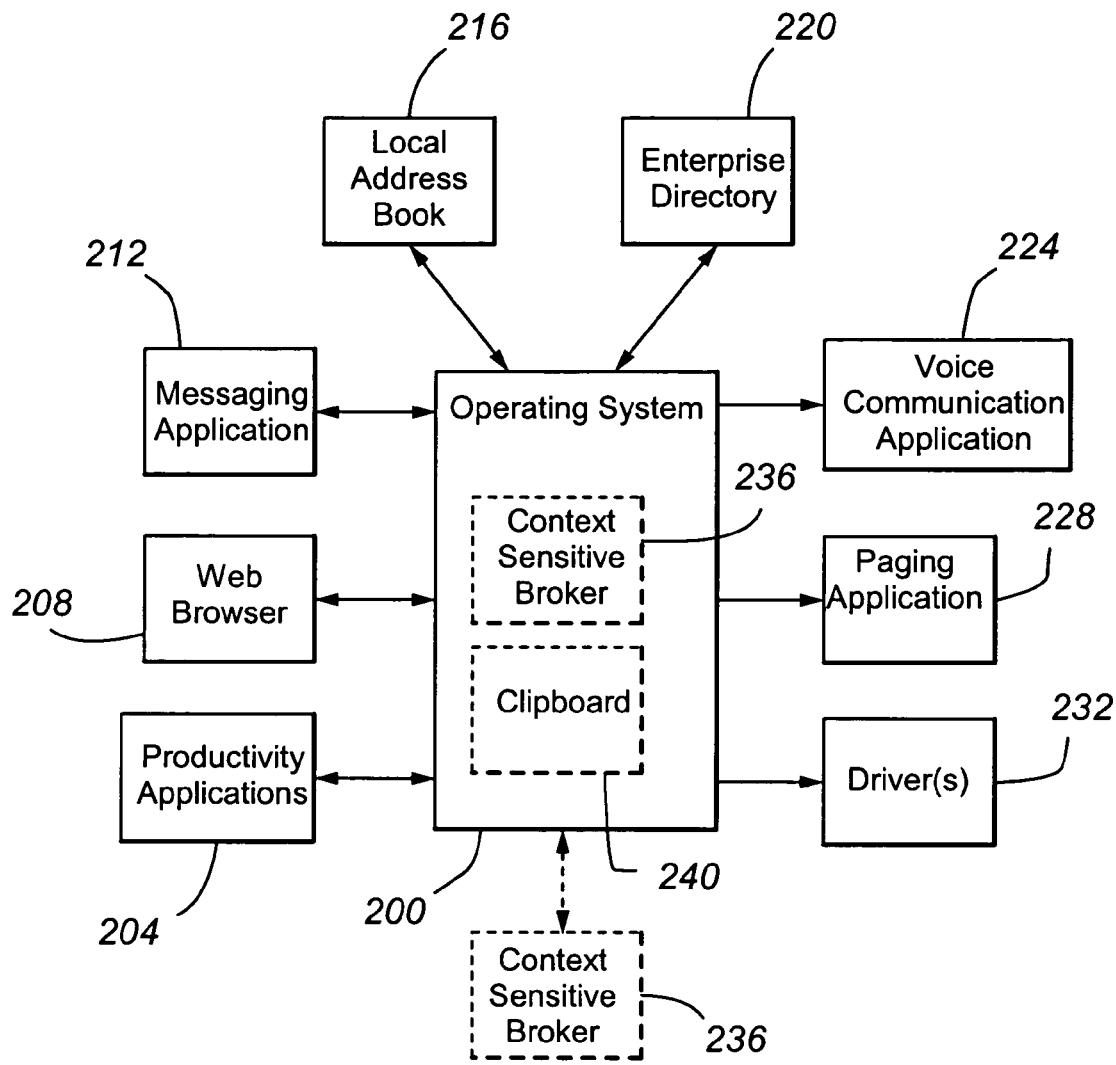
FIG. 2 is a functional block diagram of a software architecture according to an embodiment of the present invention.

An embodiment of the invention that may be used in PC 116 will now be discussed with reference to FIG. 2. The functional components of the PC 116 include an operating system 200, productivity applications 204, web browser 208, messaging application 212, local address book 216, enterprise directory 220, voice communication application 224, paging application 228, and driver(s) 232.

The operating system 200 can be any suitable software/hardware that controls the execution of programs and that may provide services such as resource allocation, scheduling, input/output control, and data management. Exemplary operating systems include the various versions of Microsoft Windows™, Microsoft DOS™, UNIX, MVS, OS/2, VM/SP, LINUX, Apple OS TIGER™, PALM™, and Blackberry™.

The productivity applications can be any external noncommunication application for performing user specified operations, such as Microsoft Word™, Corel Wordperfect™, Excel™, Lotus Notes™, Idea™, PowerPoint™, Microsoft Outlook™, Powerpoint™, Visio™, and Integrated Development Environments (IDE's).

The web browser 208 can be any application that enables the user to read hypertext in files or on the World Wide Web. Exemplary browsers include Netscape™, FireFOX™, Opera™, and Internet Explorer™.

Messaging application 212 can be any messaging enabled application or mail enabled application. Examples include email applications such as Microsoft Outlook™, Lotus Notes™, and Novell Groupwise™, instant messaging applications, such as ICQ™, AOL Instant Messenger™, and Microsoft Messenger™, and information sharing applications such as Microsoft's NetMeeting™, Webex™, and Avaya Meeting Exchange™.

The local address book 216 is a local address directory that includes contact information. The contact information includes names, addresses, telephone numbers, email addresses, instant message handles, and other information of interest to the user.

The enterprise directory 220 is a directory that may be remote or local to the PC and is maintained by enterprise administration. An example of a suitable directory is a Lightweight Directory Access Protocol or LDAP directory. It includes employee names, addresses, telephone numbers, email addresses, instant message handles, and other information of interest to the enterprise. Another example is Service Oriented Architecture or SOA. It includes various resources throughout an organization.

The voice communication application 224 can be any voice and/or video communications application. Examples include Avaya's Softphone™, Cisco IP Softphone™, Webex™, and Avaya Meeting Exchanger™.

The paging application 228 can be any application that pages a party via a pager.

Finally, the driver(s) include drivers for various hardware devices, such as the sound card 112 and LAN card 120.

Included within the PC is a context sensitive broker 236 and clipboard 240. As shown in FIG. 2, the context sensitive broker 236 may be external to the operating system 200 or internal to or incorporated into the operating system 200.

In the configuration in which the broker 236 is external to the operating system, the broker 236 monitors the contents of the clipboard for predetermined first types of information. As will be appreciated, the clipboard 240 is an area of computer memory or storage to which information can be copied for temporary storage, such as during the transfer of the information from one application to another application. An example of a clipboard enabled program is Notepad™ and the clipboard feature of the Microsoft Windows™ operating system. The first type of information is an identifier of a selected contactee and/or record associated with the contactee. Examples of first types of information include contact information (e.g., a potential contactee's first, last, and/or middle name, nickname, business or home address, and/or electronic address (such as an email address, telephone number, pager number, facsimile number, or instant messaging handle). When a predetermined type of information is cut and pasted onto the clipboard 240 by the application the user is currently working in, the context sensitive broker 236 locates a second predetermined type of information (which can include contact information different from the first type of information) and provides the user with various contact options. For example, if a user cuts and pastes a person's first and last names onto the clipboard 240, the broker 236 locates contact information for that person in various locations, such as on a web page (which may be accessed via the web browser 208 or directly by the broker 236 simulating a browser and making HTTP requests to a web page), in a file associated with a productivity application 204, in an address directory of a messaging application 212, in a local address book 216, and/or in the enterprise directory 220, and, based on the contact information identified, provides the user with a corresponding contact option on the user's Graphical User Interface or GUI (not shown). Thus, if the broker 236 locates, for the person, a telephone number and an email address but no instant message handle, the broker 236 provides only a telephone call and an email as contact options and not instant messaging.

In the configuration in which the broker 236 is incorporated into the operating system 200, the user highlights the first type of information in any record, whether in a file of a productivity application 204, a web page (e.g., Anywho.com™, Questdex.com™, and the like), the header body or attachment to an email or instant message, the local address book 216, or the enterprise directory 220, provides a search command (such as activating a hot key (e.g., Control "C" or "D"), clicking on an icon, holding down the control key and moving the cursor over the text, and the like) and the broker 236 searches for the second type of information. The search is conducted in records local to or remote from the PC. The records may be text, audio, video, and the like. If located, the broker 236 provides the user with a corresponding contact option as noted previously.

The search algorithm may be configured by the user. The user could select specific records to be searched and the hierarchical order in which they are to be searched. The user can specify the types of information are to be searched in the second type of information. For example, the user can have different commands for different types of second information and/or searches. The user can specify the maximum available search time in which the search is to be completed. If the time limit is reached, the search would stop and report its findings. The user, for example, could select various search algorithms, each searching in a different set of locations. The user could select the particular search option to be employed in a given case. When multiple conflicting entries are located, such as multiple email addresses, the broker 236 typically queries the user for a resolution of the conflict and/or to select one of the conflicting entries. The algorithm could note the user selection and provide only the selected entry in a future search. The search may interrogate the application that created or otherwise has access to the records to be searched or may open and search the record itself.

In the internal context sensitive broker configuration, the broker 236 creates a link to the first type of information. As will be appreciated, a link interconnects items of data, an item of data with a directory, an item of data with an icon, an item of data with a computer program, and/or portions of one or more computer programs and/or is a pointer to a record or file. The link is preferably a hyperlink or an item that, when selected, transfers the user directly to another location in a record, e.g., an item on a web page that, when selected, transfers the user directly to some other web page, perhaps on a different machine.

Figure 3:
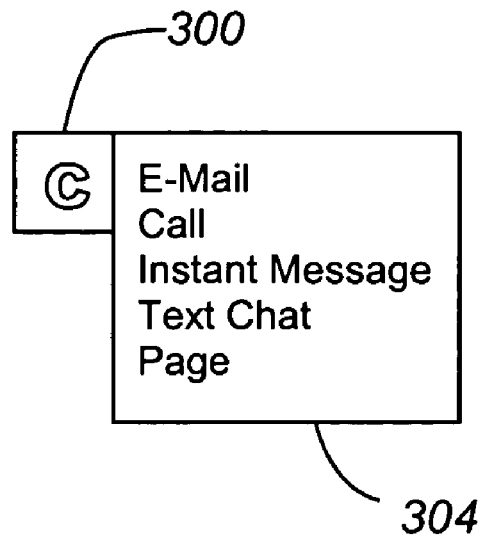
FIG. 3 depicts icons according to an embodiment of the present invention.

An example of hyperlink is shown in FIG. 3. The hyperlink is done using the icon 300. When the icon 300 is left clicked on, the broker 236 goes to the linked record, retrieves the pertinent first type of information, searches for the corresponding second type of information, and, if second type of information is located, a menu 304 appears. When one of the menu options is selected (by right clicking the mouse), the broker 236 populates the pertinent fields of the communications application responsible for the selected communication modality.

Figure 4:
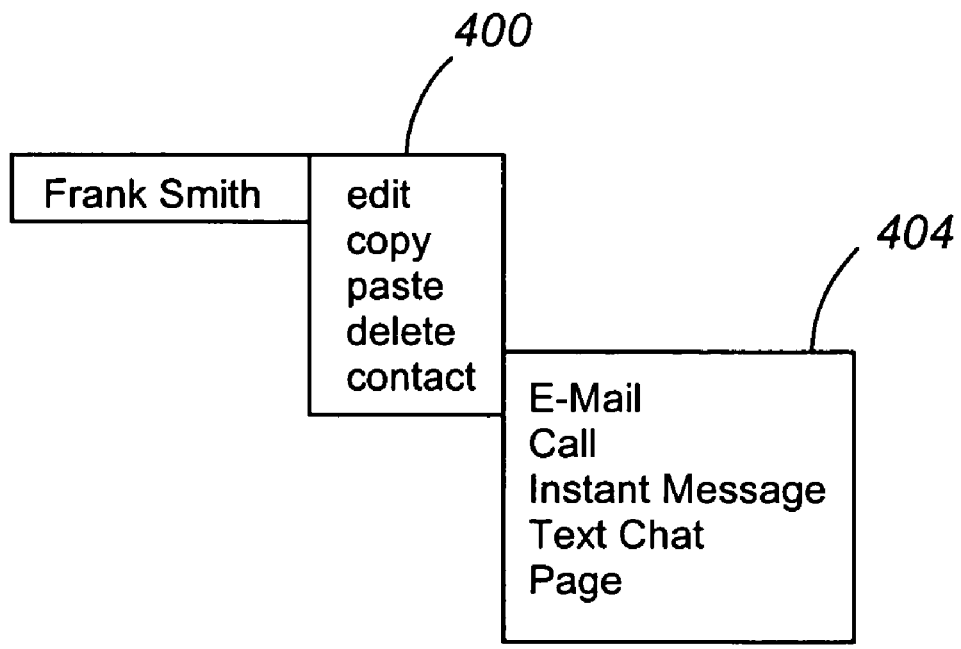
FIG. 4 depicts icons according to an embodiment of the present invention.

In an alternative configuration, the broker 236 can provide a series of options when the first type of information is highlighted. FIG. 4 is an example of this configuration. The user has highlighted the name "Frank Smith" and right clicked on the text. The broker 236 searches for the second type of information and, if located, provides various communication options. A first menu 400 appears. The first menu includes a number of productivity application options, such as "edit", "copy", "paste", and "delete" and the option "contact". When the user right clicks on "contact", a second menu 404 appears. It includes various communication options reflecting the second types of information located by the broker 236. In this case, the broker 236 located an email address, a telephone number, an instant message handle, a text chat address, and a pager number and displayed in the second menu 404 the contact options of email, call, instant message, text chat, and page.

In the external context sensitive broker configuration, the second menu 404 is presented to the user after the first type of information is pasted onto the clipboard 240. The menu can be displayed in any desirable location. Alternatively, an icon is displayed on the system tray area of the monitor if second type of information is located corresponding to the clipboard's contents. When the cursor is placed over and the user right clicks on the icon, the second menu 404 appears.

An advantage of the broker 236 is that the user, to initiate a communication to an identified person, is not required to leave the application that he or she is currently using. For example, if a user is in an incoming instant message window and needs to make a phone call to the instant message sender, the user can simply cut and paste the user's instant message handle onto the clipboard or highlight the handle and initiate a search command. The broker 236 locates the sender's contact information and provides the user with contact options including making a voice call. When the user selects the voice call option, the broker 236 provides the pertinent information to the VoIP application 224, such as populating the various fields in the form normally displayed to the user to initiate a voice call, and requests the VoIP application 224 to initiate the voice call. In an electronic messaging application, such as email or instant messaging, the broker 236 would populate the recipient fields of the text messaging form (i.e., the "TO" and "FROM" fields) with the located information and the user would then type in the text of the message and, when completed, click send to send the message. The process is seamless to the user. He or she does not see the searched records, such as the local address book, or even have to know how to operate the communication application used to initiate the communication.

Figure 5:
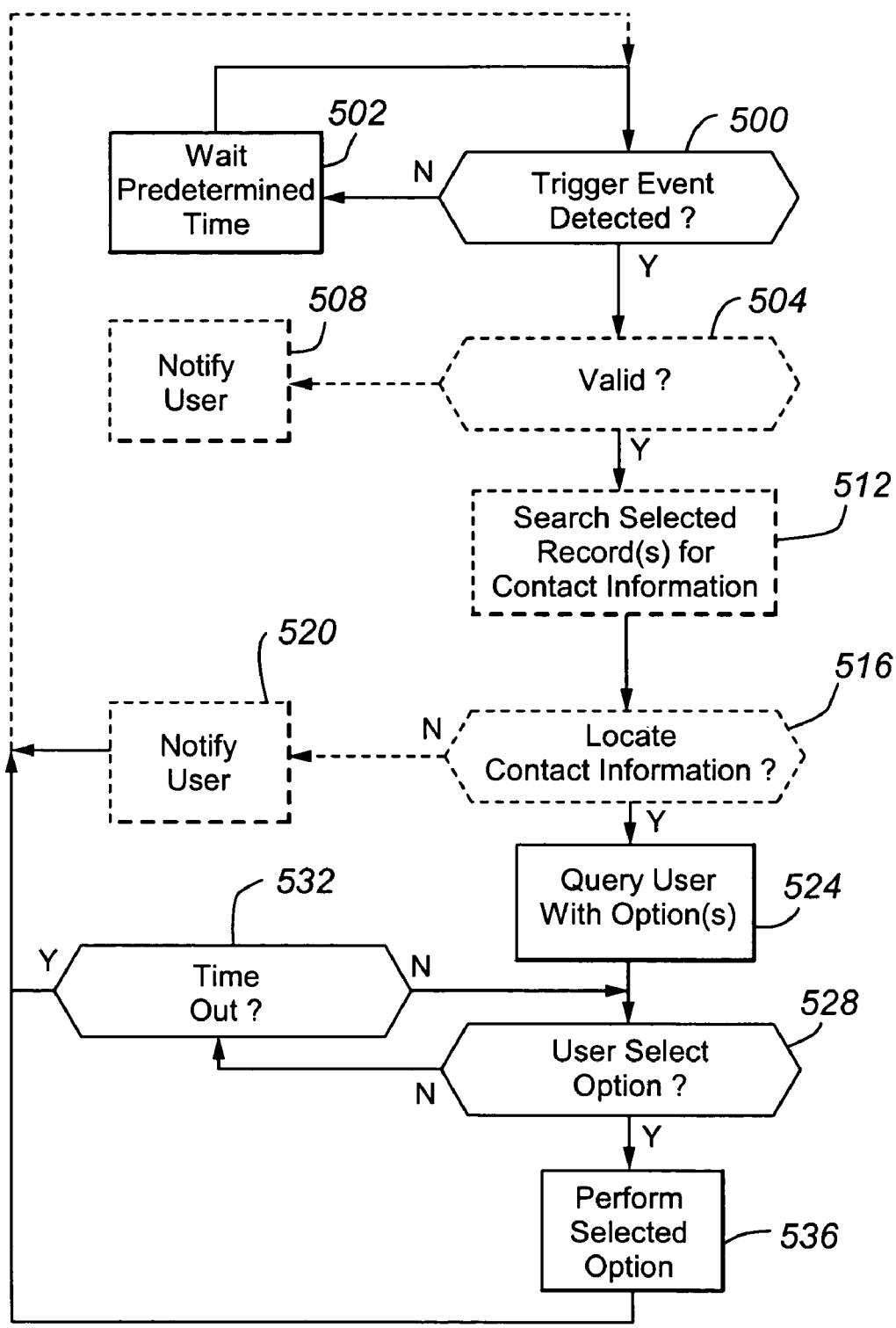
FIG. 5 is a flow chart according to an embodiment of the present invention.

The operation of the context sensitive broker 236 will now be discussed with reference to FIG. 5.

In step 500, the broker 236 identifies a trigger event. As noted, the trigger event can be any selected action, such as pasting information onto a clipboard 240, highlighting information followed by sending a command, initiating a hot key, and the like. As shown by step 502, the broker 236 periodically repeats decision diamond 500 until a trigger event is detected.

In optional decision diamond 504, the broker 236 can perform any of a number of operations. The decision diamond 504 is optional because a validity check may not be performed when the user highlights text and sends a search command. The user has presumably already checked the highlighted information for completeness and formatting. In one operation, the broker determines if the user selected text (e.g., clipboard contents or highlighted text) has the proper format to be searched. In one example, the broker 236 determines whether the characters have the format of a first type of information. In other words, is the selected text formatted like a name (e.g., have one, two, or three words separated by spaces or commas), an email address (e.g., a two words separate by an "@" symbol), and a telephone number (e.g., a combination of three digits separated by a space or dash from four digits, two sets of three digits and one set of four digits separated by a space or dash, etc.), which is configurable for international locations. In the clipboard configuration, the broker 236 can examine, continuously, periodically, or as added, the contents of the clipboard and determine without user intervention whether or not the contents qualifies as a first type of information. In another operation, the broker 236 determines whether the selected text is searchable. If, for example, the first name is abbreviated (e.g., "J. Smith" rather than "John Smith") or the text is too long (e.g., longer than 25 characters), the broker 236 may query the user for more information before proceeding with the search.

When the selected information is invalid, the broker 236 proceeds to optional step 508 and notifies the user. The broker 236 then returns to and repeats decision diamond 500.

When the selected information is valid, the broker 236 in optional step 512 searches selected record(s) for contact information as set forth previously. After the search is completed, the broker 236, in decision diamond 516 determines if any second type of information was located. If not, the broker 236 in optional step 520 notifies the user that the search has failed. If so, the broker 236 in step 524 queries the user with a menu of contact options.

The broker 236 waits for the user to select one of the options in decision diamond 528. If the user fails to select an option within a determined period of time, the broker time outs as shown by step 532. When the user selects an option, the broker 236 performs the option in step 536.

The operation of the broker 236 will now be discussed with reference to two examples.

In the first example, the operating system and broker 236 are integrated. The user opens productivity software and finds a reference to another individual (not necessarily an employee of the organization where the user is employed). The user highlights the reference (or first type of information) and holds down the control key (e.g., hotkey that is configurable). The user rolls the mouse over the highlighted reference. The broker 236 creates a dynamic hyperlink of the reference. If the user selects the hyperlink, the broker 236 will search for the reference in any determined locations, such as in the local address book or enterprise directory server. When the user left clicks on the dynamic hyperlink, the broker 236 searches for the second type of information. If the broker 236 finds the second type of information, the user displays the menu 504. If the user selects "call" and the user has an IP hardphone or digital phone, the broker 236 contacts the user's phone, rings the phone, and dials the number of the contactee. If the user selects "call" and the user has an IP softphone, the broker 236 activates the softphone application, which dials the number of the contactee. If the user selects "email", the broker 236 brings a new, blank email message menu to the foreground with the email address filled. When the user selects page, the broker 236 dials the contactee's pager number. If the broker 236 fails to find second type of information, the broker 236 displays a menu indicating that reference or first type of information could not be located.

In the second example, the operating system and broker 236 are not integrated. The user opens productivity software and finds a reference to another individual (or first type of information). The user copies the reference and pastes it onto the clipboard 240. The broker 236 detects that a potential name has been placed on the clipboard. The broker 236 scans selected records and locates the reference. The broker 236 displays a menu to the user, such as "Contact Name Here? Yes? No?" When the user selects "Yes", the broker 236 displays the second menu 404 with the communication options for which second type of information was located. When the user selects a contact option, the broker 236 proceeds as noted in the prior paragraph. When the user selects "NO", the menu 404 is dismissed, and the content remains on the clipboard 240.

The broker 236 can also be used to quickly join a conference call. Rather than highlighting a first and last name, the user could highlight (or paste onto a clipboard) a telephone number and participant code (the first type of information)

found in an email for example. In any event, the broker 236 is triggered. Assuming that the highlighted text was in the proper format, the broker 236 would use the telephone and dial the conference number and necessary codes.

In a further embodiment, the broker 236 automatically initiates a second application other than a communications application based on an action performed in a first application that is different from the second application. This embodiment has the benefit of obviating the need for the user to jump around displayed information to initiate selected applications when the user is working in a different application. For example, a user can paste text onto the clipboard that indicates that a second application is to be opened. The pasted text can be an acronym for the second application (e.g., "WP" for WordPerfect™, "WD" for Word™, "LTS" for Lotus Notes™, etc.), a command unique to the second application, a name associated with the application, and the like. Alternatively, the broker 236 can monitor a user's operations in the first application and, based on the operations, determine that the user desires to initiate the second application. This can be done for example by the contents of the text manipulated by the user in the first application or the specific sequence of steps being performed by the user. The broker 236 can be configured as a neural network with learning capability that monitors the operations of the user in the first application and knows from experience that, when the user performs a first set of operations in the first application, the user's next step is to open the second application. In other words, the broker predicts the user's next operation based on historic patterns of operations in the first application. With reference to FIG. 5, the broker 236 in this application would perform decision diamond 500, step 524, decision diamond 528, and step 536 except that the option would be to initiate the second application.

A number of variations and modifications of the invention can be used. It would be possible to provide for some features of the invention without providing others. For example in one alternative embodiment, the various software components are embodied in whole or part in a logic circuit, such as Application Specific Integrated Circuit or ASIC.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   (a) receiving, by a computer and from a user, a first type of information, the first type of information comprising a name of a potential contactee, a business address of the potential contactee, a home address of the potential contactee, and an electronic address associate with the potential contactee;
   (b) in response, searching, by the computer, for contact data associated with the first type of information in a plurality of searchable records, the records being maintained by a plurality of a productivity application, a text messaging application, a paging application, a voice communication application, a local address book, and an enterprise directory;
   (c) providing by the computer and to the user, a menu comprising a plurality of different contact options, the contact options corresponding to contact data located by the searching step (b), wherein the plurality of different contact options correspond to a plurality of email, voice call, instant message, and page;
   (d) receiving, by the computer and from the user, a selected contact option; and
   (e) in response to step (d), initiating by the computer, a communication, according to the selected contact option, with a communication device associated with the contact data.

2. The method of claim 1, wherein the first type of information is received from a clipboard of an operating system, the clipboard being a memory location for temporary storage of information, wherein the computer monitors the contents of the clipboard for a string received from the user having a structure resembling a name, business address, home address, or electronic address, and wherein step (b) is performed in response to identifying a string having the structure.

3. The method of claim 1, wherein the first type of information is received by a user highlighting, in a selected record, a selected first type of information.

4. The method of claim 3, wherein the selected record is one of a file of a productivity application, a web page, a header, body or attachment of a text message, a local address book, and a search directory and wherein the user, after highlighting the selected first type of information, provides a search command.

5. The method of claim 1, wherein the computer creates a hyperlink to the first type of information whereby, when the hyperlink is selected by the user, the user is transferred directly to another location in a record.

6. The method of claim 1, wherein fields of the menu are populated with the contact data automatically by the computer.

7. The method of claim 1, wherein, in step (e), the computer provides the contact data to a communication application corresponding to the selected contact option.

8. The method of claim 1, wherein the records are maintained by a productivity application and wherein the productivity application includes no code to initiate the communication.

9. The method of claim 1, wherein the receiving step comprises:
creating a hyperlink to the first type of information;
wherein the searching step is performed in response to the user selecting the hyperlink.

10. A computer readable medium comprising computer-executable instructions to perform the steps of claim 1.

11. A method, comprising:
(a) monitoring, by a computer, a clipboard of an operating system, the clipboard being a memory location for temporary storage of information, wherein the computer monitors the contents of the clipboard for a string received from a user having a structure resembling a first type of information;
(b) receiving, by the clipboard and from a user, a first type of information, the first type of information comprising a name of a potential contactee, a business address of the potential contactee, a home address of the potential contactee, and an electronic address associate with the potential contactee;
(c) in response to step (b), searching, by the computer, for contact data associated with the first type of information in a plurality of searchable records, the records being maintained by a plurality of a productivity application, a text messaging application, a paging application, a voice communication application, a local address book, and an enterprise directory;
(c) providing by the computer, a menu comprising a plurality of different contact options, the contact options corresponding to contact data located by the searching step (b), wherein the plurality of different contact options correspond to a plurality of email, voice call, instant message, and page;
(d) receiving, by the computer and from a user, a selected contact option; and
(e) in response to step (d), initiating by the computer, a communication, according to the selected contact option, with a communication device associated with the contact data.

12. The method of claim 11, wherein the selected record is one of a file of a productivity application, a web page, a header, body or attachment of a text message, a local address book, and a search directory and wherein the user, after highlighting the selected first type of information, provides a search command.

13. The method of claim 11, wherein the computer creates a hyperlink to the first type of information whereby, when the hyperlink is selected by the user, the user is transferred directly to another location in a record.

14. The method of claim 11, wherein fields of the menu are populated with the contact data automatically by the computer.

15. The method of claim 11, wherein, in step (e), the computer provides the contact data to a communication application corresponding to the selected contact option.

16. The method of claim 11, wherein the records are maintained by a productivity application and wherein the productivity application includes no code to initiate the communication.

17. The method of claim 11, wherein the receiving step comprises:
creating a hyperlink to the first type of information;
wherein the searching step is performed in response to the user selecting the hyperlink.

18. A computer readable medium comprising computer-executable instructions to perform the steps of claim 11.

19. A system, comprising:
(a) a user input to receive, from a user, a first type of information, the first type of information comprising a name of a potential contactee, a business address of the potential contactee, a home address of the potential contactee, and an electronic address associate with the potential contactee; and
(b) a computer operable to:
(i) in response, search for contact data associated with the first type of information in a plurality of searchable records, the records being maintained by a plurality of a productivity application, a text messaging application, a paging application, a voice communication application, a local address book, and an enterprise directory;
(ii) provide, to the user, a menu comprising a plurality of different contact options, the contact options corresponding to contact data located by the searching operation (i), wherein the plurality of different contact options correspond to a plurality of email, voice call, instant message, and page;
(iii) receive, from the user, a selected contact option; and
(iv) in response to operation (iii), initiate by the computer, a communication, according to the selected contact option, with a communication device associated with the contact data.

20. The system of claim 19, wherein the first type of information is received from a clipboard of an operating system, the clipboard being a memory location for temporary storage of information, wherein the computer monitors the contents of the clipboard for a string received from the user having a structure resembling a name, business address, home address, or electronic address, and wherein step (b) is performed in response to identifying a string having the structure.

21. The system of claim 19, wherein the first type of information is received by a user highlighting, in a selected record, a selected first type of information.

22. The system of claim 21, wherein the selected record is one of a file of a productivity application, a web page, a header, body or attachment of a text message, a local address book, and a search directory and wherein the user, after highlighting the selected first type of information, provides a search command.

23. The system of claim 19, wherein the computer creates a hyperlink to the first type of information whereby, when the hyperlink is selected by the user, the user is transferred directly to another location in a record.

24. The system of claim 19, wherein fields of the menu are populated with the contact data automatically by the computer.

25. The system of claim 19, wherein, in operation (iv), the computer provides the contact data to a communication application corresponding to the selected contact option.

26. The system of claim 19, wherein the records are maintained by a productivity application and wherein the productivity application includes no code to initiate the communication and wherein the computer is further operable to:
(v) create a hyperlink to the first type of information;
wherein the searching operation is performed in response to the user selecting the hyperlink.

* * * * *

UNITED STATES PATENT AND TRADEMARK OFFICE
CERTIFICATE OF CORRECTION

| | | |
|---|---|---|
| PATENT NO. | : 7,640,550 B1 | Page 1 of 1 |
| APPLICATION NO. | : 11/193728 | |
| DATED | : December 29, 2009 | |
| INVENTOR(S) | : Goel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Ninth Day of November, 2010

David J. Kappos
*Director of the United States Patent and Trademark Office*